United States Patent [19]

Itonaga

[11] Patent Number: 4,716,560
[45] Date of Patent: Dec. 29, 1987

[54] RECORDING DISC AND METHOD FOR FABRICATING SAME

[75] Inventor: Makoto Itonaga, Yokohama, Japan

[73] Assignee: Victor Company of Japan, Ltd., Japan

[21] Appl. No.: 735,355

[22] Filed: May 17, 1985

[30] Foreign Application Priority Data

May 22, 1984 [JP] Japan .................................. 59-103476
May 22, 1984 [JP] Japan .................................. 59-103477

[51] Int. Cl.$^4$ ................................................ G11B 7/24
[52] U.S. Cl. ........................................ 369/275; 369/44
[58] Field of Search .................... 369/44, 45, 46, 111, 369/275, 276, 13, 14, 15, 48, 50

[56] References Cited

U.S. PATENT DOCUMENTS

| | | | |
|---|---|---|---|
| 3,909,517 | 9/1975 | Clemens | 369/276 |
| 4,359,750 | 11/1982 | Howe | 369/275 |
| 4,428,075 | 1/1984 | Hazel et al. | 369/45 |

FOREIGN PATENT DOCUMENTS

| | | | |
|---|---|---|---|
| 0061584 | 10/1982 | European Pat. Off. | |
| 0070514 | 1/1983 | European Pat. Off. | |
| 0108258 | 5/1984 | European Pat. Off. | |
| 2306701 | 1/1974 | Fed. Rep. of Germany | |
| 2321164 | 11/1977 | France | 369/111 |

58-57643 4/1983 Japan .
84/03988 10/1984 PCT Int'l Appl. .

*Primary Examiner*—Donald McElheny, Jr.
*Attorney, Agent, or Firm*—Lowe, Price, Leblanc, Becker & Shur

[57] ABSTRACT

A recording disc comprises a substrate having a tracking servo groove of spiral or concentric pattern on one surface thereof. The servo groove has a constant depth and a variable width which varies to allow generation of a position indicating signal. An eraseable recording layer is deposited on the surface of the substrate to store information signals. The recording disc is fabricated by a method involving modulating the intensity of a laser beam with a permanently stored signal and directing it to the surface of a photoresist layer on a master blank placed on a rotating turntable. The beam penetrates the full thickness of the layer. The optically excited portion of the layer spreads in lateral directions by an amount proportional to the energy. The turntable is moved relative to the laser to expose a portion of the photoresist layer in spiral or concentric pattern to the directed beam. The exposed portion is then etched to form the tracking servo groove. A replica of the groove is then form on a substrate followed by the deposition of a radiation sensitive layer on the substrate.

9 Claims, 9 Drawing Figures

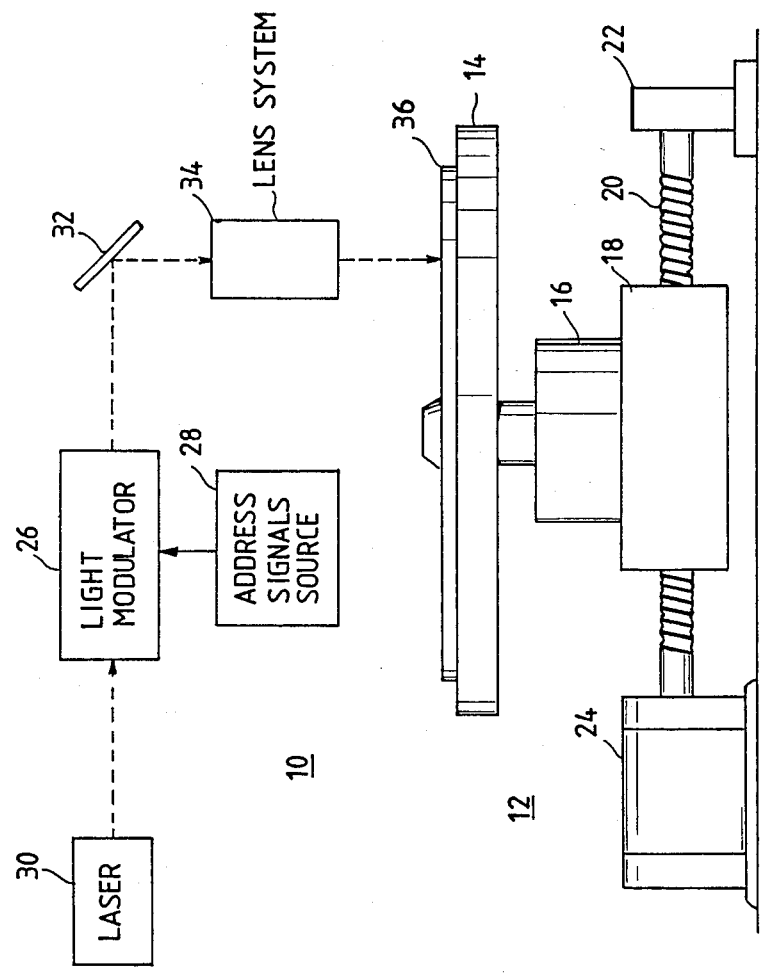

RECORDING DISC AND METHOD FOR FABRICATING SAME

BACKGROUND OF THE INVENTION

The present invention relates to a recording disc having spiral or concentric turns of a tracking servo groove and a method for fabricating such discs.

One approach to high density disc recording involves forming a tracking servo groove on the disc surface to allow a recording or reading laser beam to precisely follow a desired path.

A recording disc of the type shown and described in Japanese Patent Laid-open Publication 58-57643 is provided with a spiral pattern of tracking servo groove. The groove is modulated in depth so that lands are created at specified positions of tracks. The edges of the groove and the lands are sensed by diffraction of the laser beam to derive a tracking servo control signal and a position indicating signal. A recording layer is deposited on the groove to eraseably store information signals. However, the depth modulation results in the generation of a significantly high amplitude position signal which interferes with the information signal if the range of depth variations, or modulation index, is greater than a certain value, which is approximately 10%. However, this value of modulation index would require the disc surface to vary in depth within a range of 100 Angstroms which is impractical to manufacture.

SUMMARY OF THE INVENTION

It is therefore an object of the present invention to provide a recording disc having a variable width groove which is easy to manufacture and a method for fabricating such discs.

According to the invention, a recording disc comprises a substrate having a tracking servo groove of spiral or concentric pattern on one surface thereof. The servo groove has a constant depth and a variable width which allows a recording or reading laser beam to be modulated in intensity to derive a tracking control signal and a position indicating signal. An eraseable recording layer is deposited on the surface of the substrate to store information signals. For a satisfactory value of width modulation index, the groove is modulated in width in a range of 2000 Angstroms.

According to a further aspect of the invention, the method for fabricating the recording disc comprises modulating the intensity of a laser beam in accordance with a position indicating signal which is to be permanently stored in the recording disc. The modulated laser beam is directed to the surface of a photoresist layer of a master blank placed on a rotating turntable. The laser beam penetrates the full thickness of the layer. The optically excited portion of the photoresist spreads in lateral directions by an amount proportional to the amount of the energy. One of the modulated laser beam and the turntable is moved relative to the other to expose a portion of the photoresist layer in spiral or concentric pattern to the directed beam. The exposed portion is then etched to form a tracking servo groove having a constant depth equal to the thickness of the layer and a width variable as a function of the optical energy of the laser beam. A replica of the groove is formed on a substrate followed by the deposition of a radiation sensitive layer on the substrate.

BRIEF DESCRIPTION OF THE DRAWINGS

The present invention will be described in further detail with reference to the accompanying drawings, in which:

FIG. 1 is a block diagram of an apparatus for forming spiral or concentric turns of tracking servo groove having a constant depth and a variable width on a photoresist layer according to the present invention;

DETAILED DESCRIPTION

Figure 2A:
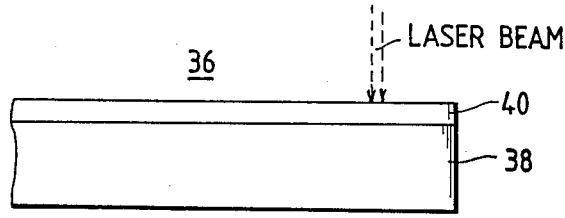
FIGS. 2A to 2E are illustrations of steps for fabricating a recording disc.

Referring now to FIG. 1, there is shown an apparatus for producing a variable width, constant depth tracking servo groove on a master disc according to the present invention. The apparatus generally comprises an optical system 10 and a mechanical drive system 12. The drive system includes a turntable 14 driven by a motor 16 mounted on a carrier 18. Carrier 18 is threadably mounted on an externally threaded drive shaft 20 which is supported at one end on a support 22 and connected at the other end to a motor 24.

The optical system 10 includes a light modulator 26 which modulates the intensity of a laser beam emitted by a laser source 30 in accordance with address signals supplied from a signal source 28. The modulated laser beam is reflected by a mirror 32 to a lens system 34 which shapes the cross section of the light beam into a rectangular section with the longer sides of the rectangle being parallel with the radial directions of the turntable 14.

On the turntable 14 is placed a master blank 36 below lens system 34. As shown in FIG. 2A, the blank 36 comprises a glass substrate 38 and a layer 40 of photoresist deposited on the substrate 38.

With the motors 16 and 24 being energized, the turntable 14 is spun at a constant angular velocity, for example. During each revolution the turntable is moved in a radial direction by the motor 24 to permit the light beam from lens system 34 to follow a spiral pattern. The operation starts with the laser beam positioned on the outermost convolution and terminates when the beam reaches the innermost convolution.

Figure 2B:
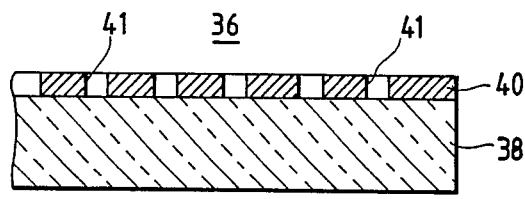

As shown at FIG. 2B, the light exposed portion of the photoresist layer 40 is etched away in a known manner to create a spiral groove 41 having a width that is variable as a function of the intensity of the beam incident on the photoresist 40, and hence in response to the address signals.

As will be described later, the thickness of photoresist layer 40 and the minimum intensity of the laser beam are determined so that the beam incident thereon penetrates the full thickness of photoresist layer 40 when its intensity is minimum, and therefore the groove has a uniform depth equal to the thickness of the photoresist layer at any intensity of the beam.

Figure 2C:
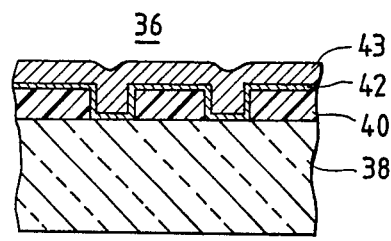

As shown in FIG. 2C, aluminum or nickel is sputtered on the glass substrate 38 to form a metal film 42 that follows the surface contour of the spiral groove 41.

Figure 2D:
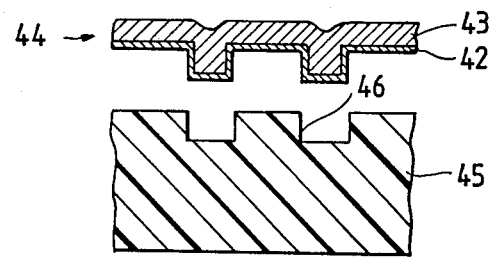
Figure 2E:
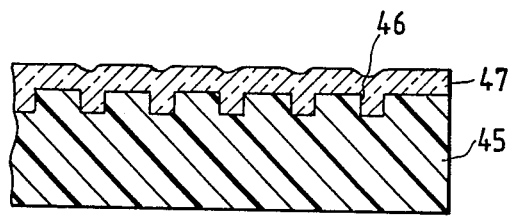

Nickel is then electroplated over the metal film 42 to form a metal lining 43 as a reenforcement. The metal film 42 and lining 43 form a die 44, which is removed from the glass substrate 38 to be stamped on a disc 45 of thermosetting resin to create a groove pattern 46 which is a replica of the groove 41 (FIG. 2D). A radiation sensitive layer 47 is then deposited in a known manner on the resin disc 45 (FIG. 2E) where spiral groove 46 has been formed. The radiation sensitive material is formed of a phase transformable material such as $TeO_x$-GeSn which changes between crystalline and amorphous states in response to the application of a laser beam or formed of a thermomagnetic material such as MnBi, MnCuBi and GdCo. These materials permit signals to be stored by application of laser beam and erased by reapplication of the beam.

Figure 3:
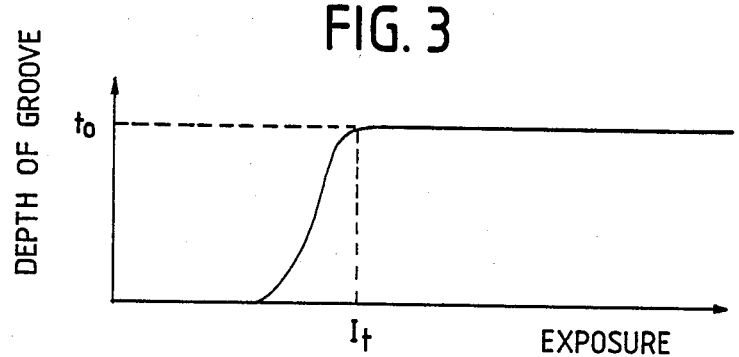
FIG. 3 is a graphic representation of the depth of the groove formed in the photoresist layer plotted against the amount of its exposure to a laser beam.

As shown in FIG. 3, the depth of exposure to light from the surface of a photoresist, and hence the depth of a groove created is proportional to the incident beam intensity until a critical point $I_t$ is reached.

According to the invention, the laser beam at minimum intensity produces an exposure which is greater than the critical point $I_t$ and the groove produced by etching has a constant depth $t_o$ which is equal to the thickness of the photoresist layer. The laser beam incident on the photoresist has an intensity greater than the critical point. The portion of the photoresist layer which is optically excited by such laser beam spreads in lateral directions by an amount proportional to the amount of applied energy, creating a groove having a variable width proportional to the incident beam intensity.

Figure 4:
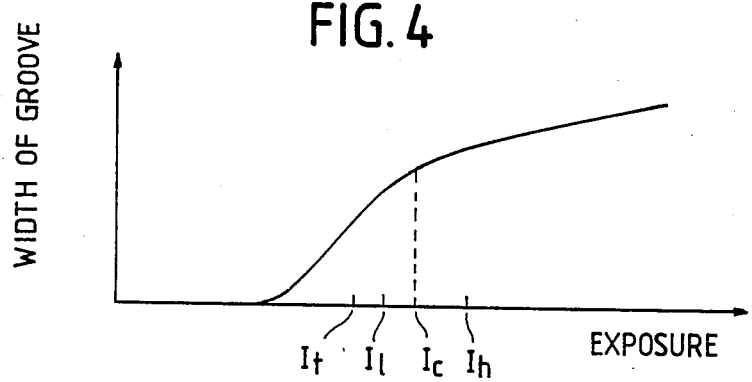
FIG. 4 is a graphic representation of the width of the groove plotted against exposure.

The laser beam has a normal value of intensity $I_c$ in the absence of the modulating signal. Upon modulation with the digital address signals, the beam intensity increases to a maximum value $I_h$ in response to the presence of a digital pulse of a first address signal indicating a track number, for example, and returns to the normal intensity in response to the absence of the pulses of the first address signal and decreases to a minimum intensity $I_l$ in response to the presence of a digital pulse of a second address signal representing a sector number, for example, and returns to normal in response to the absence of the pulses of the second address signal. As shown in FIG. 4, the width of the groove in the photoresist varies nonlinearly as a function of exposure. The minimum intensity is higher than the critical point $I_t$ and the normal intensity $I_c$ preferably corresponds to a point where the incremental rate of width variation begins to decrease with increase in exposure.

Figure 5:
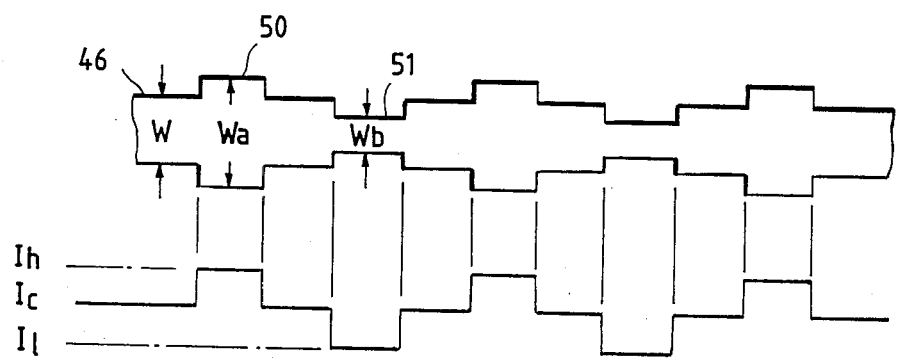
FIG. 5 is a plan view of a section of the variable width groove in relation to the modulated beam intensity.

A section of a variable width tracking servo groove 46 is shown in FIG. 5. When the beam is at normal intensity $I_c$, the groove has a normal width W. In the absence of any address signals the normal width portion of the groove continues and a read beam senses the edges of this portion by diffraction in order to derive a servo control signal. When the beam is at maximum intensity $I_h$, the edges of the groove are offset outwardly from the center of the groove to form a portion 50 having a larger width Wa and when it is at minimum intensity $I_l$ the edges of the groove are offset inwardly toward the center of the groove to form a portion 51 having a smaller width Wb. As the read beam scans the groove it is maintained along its center in response to the servo control signal and is modulated in intensity with the width variations.

Information signals are recorded in the portion of recording layer 47 deposited on the groove 46.

In comparison with the prior art depth modulation technique, the width modulation technique as taught by the present invention ensures greater tolerances in manufacture. For 10% modulation index, it is shown that the invention allows the groove to vary in width within the range of 2000 Angstroms (typically, between 7000 and 9000 Angstroms) with a constant depth of 650 Angstroms. The variation range of the invention is thus 20 times greater than the variation range of the prior art.

What is claimed is:

1. A recording disc comprising:
    a substrate having a tracking servo groove of spiral or concentric pattern on one surface thereof, said groove having a constant depth and a variable width, the variable width groove having offset edge portions thereof offset from a predetermined width in accordance with a position indicating signal; and
    a recording layer deposited on said surface of the substrate.

2. A recording disc as claimed in claim 1, wherein said tracking servo groove has edge portions offset outwardly from the predetermined width of the groove in accordance with said position indicating signal.

3. A recording disc as claimed in claim 1, wherein said tracking servo groove has edge portions offset inwardly from the predetermined width of the groove in accordance with said position indicating signal.

4. A recording disc as claimed in claim 1, wherein said tracking servo groove has first edge portions offset outwardly from the predetermined width of the groove in accordance with a first position indicating signal and second edge portions which offset inwardly from the predetermined width of the groove in accordance with a second position indicating signal.

5. A recording disc comprising:
    a substrate having a tracking servo groove on one surface thereof, said groove having a constant depth and a modulated width,
    said groove having edge portions thereof separated by a distance determined in accordance with a position indicating address signal; and
    a recording layer deposited on said surface of the substrate for recording information in a non-interfering manner with respect to the modulated width information recorded in said servo groove.

6. A recording disc as recited in claim 5, wherein said recording layer comprises a radiation sensitive layer including an information recording region for erasably recording thereon information separate from the position information recorded in said servo groove.

7. A recording disc as recited in claim 6, wherein
    said radiation sensitive layer includes a reversibly phase transformable material responsive to irradiation by a laser beam to record said information as phase variations thereon.

8. A recording disc as recited in claim 6 wherein said servo groove comprises a series of concentric grooves.

9. A recording disc as recited in claim 6 wherein said servo groove comprises a continuous spiral groove.

* * * * *